United States Patent Office 2,967,180
Patented Jan. 3, 1961

2,967,180
HETEROCYCLIC PHOSPHONOTHIOATES

Henry Tolkmith, Midland, Mich., assignor to The Dow Chemical Company, Midland, Mich., a corporation of Delaware No Drawing. Filed Oct. 28, 1959, Ser. No. 849,134

5 Claims. (Cl. 260—250)

The present invention is directed to phosphonothioates corresponding to the formula

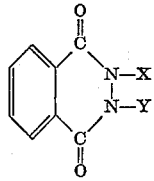

wherein X represents a radical having the formula

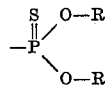

in which each R is lower alkyl, and Y represents lower alkanoyl or X. The expressions "lower alkyl" and "lower alkanoyl" are employed in the present specification and claims to refer to radicals containing from 1–5 carbon atoms, inclusive. These new compounds are crystalline or liquid products which are somewhat soluble in many organic solvents and of low solubility in water. They are useful as intermediates for the preparation of more complex phosphorus derivatives. The compounds are also useful as parasiticides and are adapted to be employed as active toxic constituents of compositions for the control of mite, insect and bacterial organisms such as flies, roaches, beetles and southern army worms.

The phosphonothioates may be prepared by reacting phthalyl dichloride with a phosphorus compound corresponding to the formula

X—NH—NHY

The reaction is carried out in the presence of an alkaline reagent such as a tertiary amine and preferably in an inert organic liquid as reaction medium. Good results are obtained when one molecular proportion of the phthalyl dichloride is reacted with one molecular proportion of the O,O-di(lower alkyl) 2-alkanoylphosphorohydrazidothioate or the O,O,O,O-tetra (lower alkyl) hydrazodiphosphorothioate in the presence of two molecular proportions of the alakline reagent. The reaction is somewhat exothermic and takes place smoothly at the temperature range of from 0° to 100° C. with the production of the desired product and chloride of reaction. This chloride appears in the reaction mixture as the chloride of the alkaline reagent such as tertiary amine hydrogen chloride. The temperature may be controlled by regulating the rate of contacting the reagents and by external cooling.

In carrying out the reaction, the phthalyl dichloride is added slowly portionwise to the phosphorohydrazidothioate or hydrazodiphosphorothioate reagent and in the presence of the alkaline reagent. The contacting is carried out in the reaction solvent with stirring and at a temperature of from 0° to 100° C. Upon completion of the reaction, the reaction mixture may be washed with water or filtered to separate halide of reaction, and any reaction medium removed by evaporation to obtain the desired product as a residue. This product may be purified by conventional procedures such as recrystallization or extraction with suitable solvents.

The following examples merely illustrate the invention and are not to be construed as limiting.

*Example 1.—O,O,O,O-tetraethyl 1,2,3,4-tetrahydro-1,4-dioxo-2,3-phthalazinylenediphosphonothioate*

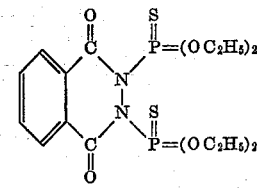

Phthalyl dichloride (20.5 grams; 0.1 mole) was dispersed in 250 milliliters of benzene and the resulting solution added slowly portionwise to a mixture consisting of 33.5 grams (0.1 mole) of O,O,O,O-tetraethyl hydrazodiphosphorothioate and 21 grams (0.2 mole) of triethyl amine dispersed in 250 milliliters of benzene. The addition was carried out over a period of three hours with stirring at room temperature. Stirring was thereafter continued and the reaction mixture heated to 50° C. and maintained thereat for five hours to complete the reaction. The reaction mixture was then filtered to separate triethyl amine hydrochloride and the hydrochloride extracted with 500 milliliters of diethyl ether. The filtrate and ether extracts were then combined and the resulting mixture concentrated by fractional distillation under reduced pressure at gradually increasing temperature up to a temperature of 50° C. at 15 millimeters' pressure. As a result of these operations, there was obtained an O,O,O,O-tetraethyl 1,2,3,4-tetrahydro-1,4-dioxo-2,3-phthalazinylenediphosphonothioate product as a solid residue. This product was successively recrystallized from cyclohexane and a mixture of cyclohexane and diethyl ether and found to melt at 106°–107° C., and to have nitrogen, phosphorus and sulfur contents of 6.2 percent, 13.1 percent and 13.65 percent, respectively, as compared to theoretical contents of 6.0 percent, 13.28 percent and 13.75 percent.

*Example 2.—O,O,O,O-tetramethyl 1,2,3,4-tetrahydro-1,4-dioxo-2,3-phthalazinylenediphosphonothioate*

Phthalyl dichloride (0.1 mole) was dispersed in 250 milliliters of benzene and the resulting solution added slowly portionwise to a mixture consisting of 28 grams (0.1 mole) of O,O,O,O-tetramethyl hydrazodiphosphorothioate and 0.2 mole of triethyl amine dispersed in 250 milliliters of benzene. The addition was carried out over a period of three hours and at room temperature with stirring. Following the addition, the reaction mixture was filtered to separate triethyl amine hydrochloride, and the hydrochloride extracted with 500 milliliters of diethyl ether. The filtrate and the ether extracts were then combined and the resulting mixture concentrated by distillation under reduced pressure at gradually increasing temperatures up to a temperature of 50° C. at 15 millimeters' pressure. As a result of these operations, there was obtained an O,O,O,O-tetramethyl 1,2,3,4-tetrahydro - 1,4 - dioxo - 2,3 - phthalazinylenediphos - phonothioate product as a crystalline residue. This product was crystallized from diethyl ether and found to melt at 112°–114° C. and contain nitrogen, phosphorus and sulfur contents of 6.76 percent, 14.82 percent and 15.29 percent, respectively, as compared to theoretical contents of 6.82 percent, 15.1 percent and 15.63 percent,

Example 3.—O,O-diethyl 1,2,3,4-tetrahydro-3-acetyl-1,4-dioxo-2-phthalazinylphosphonothioate

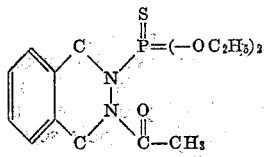

Phthalyl dichloride (31 grams; 0.15 mole) was dispersed in 250 milliliters of benzene and the resulting solution added slowly portionwise to 34 grams (0.15 mole) of O,O-diethyl 2-acetylphosphorohydrazidothioate and 32 grams (0.315 mole) of triethyl amine dispersed in 250 milliliters of benzene. The addition was carried out over a period of three hours with stirring and at room temperature. Following the addition, the reaction mixture was filtered to separate triethyl amine hydrochloride and the hydrochloride extracted with diethyl ether. The filtrate and the ether extracts were then combined and the resulting mixture distilled at gradually increasing temperatures up to a temperature of 50° C. to 15 millimeters' pressure to obtain an O,O-diethyl 1,2,3,4-tetrahydro-3-acetyl-1,4-dioxo-2-phthalazinylphosphonothioate product as a solid residue. This product was crystallized from diethyl ether and found to melt at 96°–98° C., and have nitrogen phosphorus and sulfur contents of 7.8 percent, 8.74 percent and 8.91 percent, respectively, as compared to theoretical contents of 7.86 percent, 8.69 percent and 8.98 percent.

Example 4.—O,O-dimethyl 1,2,3,4-tetrahydro-3-acetyl-1,4-dioxo-2-phthalazinylphosphonothioate Acetyl chloride (23.5 grams; 0.3 mole) was dispersed in 500 milliliters of benzene and the resulting solution added portionwise to a mixture consisting of 47 grams (0.3 mole) of O,O-dimethyl phosphorohydrazidothioate and 32 grams (0.316 mole) of triethyl amine dispersed in 500 milliliters of benzene to produce an O,O-dimethyl 2-acetylphosphorohydrazidothioate product. The addition was carried out over a period of three hours and at room temperature with stirring. Upon completion of the reaction, an additional amount of triethyl amine, 63 grams (0.625 mole) was added to the reaction mixture. Phthalyl dichloride (0.3 mole) was dissolved in 500 milliliters of benzene and added portionwise to the resulting mixture. The addition was carried out at room temperature with stirring and over a period of three hours. Following the addition, the reaction mixture was filtered to separate amine hydrochloride and the hydrochloride extracted with diethyl ether. The ether extract and filtrate were then combined and the solvent removed by evaporation to obtain an O,O-dimethyl 1,2,3,4 - tetrahydro - 3 - acetyl - 1,4 - dioxo - 2-phthalazinylphosphonothioate product as a solid. This product was crystallized from diethyl ether and found to melt at 112°–113° C., and have nitrogen, phosphorus and sulfur contents of 8.58 percent, 9.47 percent and 10.08 percent, respectively as compared to theoretical contents of 8.56 percent, 9.46 percent and 9.8 percent.

In a similar manner, other compounds of the present invention may be prepared as follows:

O,O'-dimethyl O,O'-diamyl 1,2,3,4-tetrahydro-1,4-dioxo-2,3-phthalazinylenediphosphonothioate by reacting phthalyl dichloride with O,O'-dimethyl-O,O'-diamyl hydrazodiphosphorothioate in the presence of tributyl amine.

O,O-diamyl 1,2,3,4-tetrahydro-3-valeryl-1,4-dioxo-2-phthalazinylphosphonothioate by reacting phthalyl dichloride with O,O-diamyl 2-valerylphosphorohydrazidothioate in the presence of tripropyl amine.

O-methyl-O-ethyl 1,2,3,4-tetrahydro-3-propionyl-1,4-dioxo-2-phthalazinylphosphonothioate by reacting phthalyl dichloride with O-methyl O-ethyl 2-propionylphosphorohydrazidothioate in the presence of triethyl amine.

O,O,O',O'-tetrabutyl 1,2,3,4-tetrahydro-1,4-dioxo-2,3-phthalazinylenediphosphonothioate by reacting phthalyl dichloride with O,O,O',O'-tetrabutyl hydrazodiphosphonothioate in the presence of triethyl amine.

O-methyl-O-propyl 1,2,3,4-tetrahydro-3-butyryl-1,4-dioxo-2-phthalazinylhposphorothioate by reacting phthalyl dichloride with O-methyl-O-propyl 2-butyrylphosphorohydrazidothioate in the presence of triethyl amine.

The new compounds of the present invention are effective as parasiticides and are adapted to be employed for the control of many bacterial and insect organisms. For such use, the products may be dispersed on an inert finely divided solid and employed as dusts. Also, such mixtures may be dispersed in water with the aid of a surface active agent, and the resulting aqueous suspensions employed as sprays. In other procedures, the products may be employed as constituents of oil-in-water emulsions or water dispersions with or without the addition of surface active dispersing agents. In representative operations, 100 percent controls of flies and bean beetles are obtained with aqueous compositions containing 500 parts by weight of O,O,O,O-tetraethyl 1,2,3,4-tetrahydro-1,4-dioxo-2,3-phthalazinylenediphosphonothioate per million parts by weight of ultimate composition.

The O,O-di(lower alkyl) 2-lower alkanoyl phosphorohydrazidothiates employed as starting materials as herein described may be prepared by reacting one molecular proportion of an O,O-di(lower alkyl) phosphorohydrazidothioate with a lower alkyanoyl halide. The reaction is carried out in the presence of an alkylene agent such as a tertiary amine and in an inert organic liquid as reaction medium. The reaction takes place smoothly at temperatures of from 0°–100° C. with the production of the desired intermediate and halide of reaction which halide appears in the reaction mixture as the halide of the alkaline reagent. Following the reaction, the desired intermediate may be separated by conventional methods. The O,O-di(lower alkyl) phosphorohydrazidothioates employed as starting materials may be prepared in known methods by reacting two molecular proportions of hydrazine hydrate with one molecular proportion of a suitable O,O-di(lower alkyl) phosphorochloridothiate. Also, the O,O,O,O-tetra(lower alkyl) hydrazodiphosphorothioate starting materials may be produced by reacting three molecular proportions of anhydrous hydrazine with two molecular proportions of a suitable O,O-di(lower alkyl) phosphorochloridothioate. Such reactions are carried out in an inert organic liquid as reaction medium and takes place smoothly at temperatures of from 0°–50° C. with the production of the desired intermediate and hydrazine hydrochloride of reaction. Upon completion of the reaction, the desired intermediate may be separated by conventional procedures.

I claim:

1. The phosphorothioates corresponding to the formula

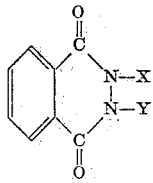

wherein X represents a radical having the formula

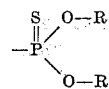

in which each R is lower alkyl, and Y represents a member of the group consisting of lower alkanoyl and X.

2. O,O,O,O-tetraethyl 1,2,3,4-tetrahydro-1,4-dioxo-2,3-phthalazinylenediphosphonothioate.

3. O,O,O,O-tetramethyl 1,2,3,4-tetrahydro-1,4-dioxo-2,3-phthalazinylenediphosphonothioate.

4. O,O-diethyl 1,2,3,4-tetrahydro-3-acetyl-1,4-dioxo-2-phthalazinylphosphonothioate.

5. O,O-dimethyl 1,2,3,4-tetrahydro-3-acetyl-1,4-dioxo-2-phthalazinylphosphonothioate.

References Cited in the file of this patent

UNITED STATES PATENTS

| | | |
|---|---|---|
| 2,654,689 | Ligett et al. | Oct. 6, 1953 |
| 2,759,938 | Du Breuil | Aug. 21, 1956 |

FOREIGN PATENTS

| | | |
|---|---|---|
| 713,278 | Great Britain | Aug. 11, 1954 |